(12) United States Patent
Prust et al.

(10) Patent No.: US 9,707,651 B2
(45) Date of Patent: Jul. 18, 2017

(54) WORKPIECE CHANGER

(71) Applicant: CHIRON-WERKE GmbH & Co. KG, Tuttlingen (DE)

(72) Inventors: Dirk Prust, Tuttlingen (DE); Michael Eble, Fridingen (DE)

(73) Assignee: CHIRON-WERKE GmbH & Co. KG, Tuttlingen (DE)

( * ) Notice: Subject to any disclaimer, the term of this patent is extended or adjusted under 35 U.S.C. 154(b) by 357 days.

(21) Appl. No.: 14/624,848

(22) Filed: Feb. 18, 2015

(65) Prior Publication Data

US 2015/0165576 A1 Jun. 18, 2015

Related U.S. Application Data

(63) Continuation of application No. PCT/EP2013/066883, filed on Aug. 13, 2013.

(30) Foreign Application Priority Data

Aug. 23, 2012 (DE) .................. 10 2012 107 785

(51) Int. Cl.
*B23Q 1/66* (2006.01)
*B23Q 1/54* (2006.01)
(Continued)

(52) U.S. Cl.
CPC .............. *B23Q 1/522* (2013.01); *B23Q 1/527* (2013.01); *B23Q 1/5468* (2013.01); *B23Q 1/64* (2013.01);
(Continued)

(58) Field of Classification Search
CPC ........... Y10T 29/5196; Y10T 408/5614; Y10T 408/5616; Y10T 409/305824;
(Continued)

(56) References Cited

U.S. PATENT DOCUMENTS

| 2,348,062 A | * | 5/1944 | Faber | ................. | B23K 37/0452 |
| | | | | | 269/185 |
| 3,868,101 A | * | 2/1975 | Nozaki | .................. | B23Q 1/527 |
| | | | | | 269/139 |
| 4,603,456 A | * | 8/1986 | Hiroyasu | ............. | B23Q 7/1489 |
| | | | | | 198/345.3 |

FOREIGN PATENT DOCUMENTS

DE 3505138 C2 5/1987
DE 19907617 A1 8/2000
(Continued)

OTHER PUBLICATIONS

EPO Machine Translation of DE19907617A1—Armleder, Wolfgang, "Machine tool with double tilting tables, fitted between and on two tilting disks turning about horizontal axis at side of machine tool frame," Aug. 31, 2000.*

(Continued)

*Primary Examiner* — Erica E Cadugan
*Assistant Examiner* — Michael Vitale
(74) *Attorney, Agent, or Firm* — Jason H. Vick; Sheridan Ross, PC

(57) ABSTRACT

A workpiece change for use in a machine tool that comprises a tool spindle for clamping tools for machining workpieces, comprises two wheels arranged parallel to one another and rotatable about an axis of rotation into at least two prominent angular positions. Two swivel tables for clamping workpieces are arranged between the wheels and are each mounted on the wheels to swivel about a swivel axis which runs parallel to the axis of rotation. In each prominent angular position, one of the swivel tables is located in its working position in which clamped workpieces can be machined with the tools. Both wheels are supported at their rim.

22 Claims, 8 Drawing Sheets

(51) Int. Cl.
*B23Q 5/04* (2006.01)
*B23Q 7/02* (2006.01)
*B23Q 7/14* (2006.01)
*B23Q 39/02* (2006.01)
*B23Q 1/52* (2006.01)
*B23Q 1/64* (2006.01)

(52) U.S. Cl.
CPC ............... *B23Q 1/66* (2013.01); *B23Q 5/04* (2013.01); *B23Q 7/02* (2013.01); *B23Q 7/1431* (2013.01); *B23Q 39/029* (2013.01); *Y10T 29/5196* (2015.01); *Y10T 409/30588* (2015.01); *Y10T 409/30896* (2015.01); *Y10T 409/305264* (2015.01); *Y10T 409/305432* (2015.01); *Y10T 409/305824* (2015.01)

(58) Field of Classification Search
CPC ............ Y10T 409/30896; B23Q 1/522; B23Q 1/527; B23Q 1/64; B23Q 1/66; B23Q 7/1431
USPC ......... 29/33 P; 269/55, 71, 289 MR; 408/89, 408/90; 409/168, 224
See application file for complete search history.

(56) References Cited

FOREIGN PATENT DOCUMENTS

| DE | 10322850 A1 | * | 12/2004 | ........... B23Q 1/5468 |
|---|---|---|---|---|
| DE | WO 2007079770 A1 | * | 7/2007 | ........... B23Q 1/4828 |
| DE | WO 2011095578 A1 | * | 8/2011 | ............... B23Q 1/52 |
| EP | 1122027 A1 | | 8/2001 | |
| FR | 2546095 | | 11/1984 | |

OTHER PUBLICATIONS

International Search Report (including translation) for corresponding International Application No. PCT/EP2013/066883, mailed Oct. 22, 2013.
International Preliminary Report on Patentability for corresponding International Application No. PCT/EP2013/066883, mailed Feb, 24, 2015.
Examination Report for corresponding German Application No. 10 2012 107 785.1, mailed Nov. 11, 2015.

* cited by examiner

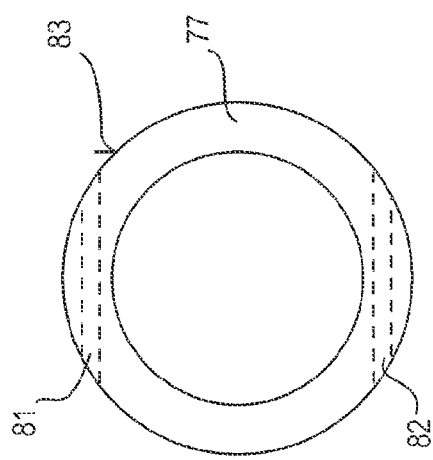

ic patent application PCT/EP-2013/066883, filed Aug. 13, 2013 and designating the United States, which was published in German as WO 2014/029661 A1, and claims priority to German patent application DE 10 2012 107 785.1, filed Aug. 23, 2012, each of which are incorporated herein by reference in their entirety.

BACKGROUND OF THE INVENTION

Field of the Invention

The present invention relates to a workpiece changer for a machine tool with Stool spindle into which the tools can be clamped for machining workpieces, with two wheels which are arranged parallel to one another and which are rotatable about an axis of rotation into at least two angular positions, at least two swivel tables for clamping workpieces, the swivel tables being arranged between the wheels and mounted in a swivelling manner on said wheels, each about a respective swivel axis, which swivel axis runs parallel to the axis of rotation, and wherein in each angular position one of the swivel tables is located in its working position in which clamped workpieces can be machined with the tools.

Related Prior Art

Such a workpiece changer is known, for example, from DE 35 05 138 C2.

The known and other workpiece changer can in principle be used with vertical or horizontal tool spindles, wherein the tool spindles can be moved relative to the workpiece changer in the three orthogonal spatial axes X, Y and Z. Moreover, the working spindle can be mounted in a swivelling manner about one of the spatial axes.

Devices with which the workpieces to be machined are clamped are arranged on the at least two swivel tables so that they are available for machining.

While one of the swivel tables is in its working position, in which the workpiece clamped on it is machined, the other swivel table is located in a position in which a finished machined workpiece can be removed and a new workpiece to be machined can be clamped.

Both swivel tables are each mounted in a swivelling manner between the wheels so that a clamped workpiece can point upwards both in the working position and in the position in which workpieces are changed. For this purpose, it is necessary that, in the case of each change of workpiece, each swivel table is rotated 180° between the wheels.

The swivel axis of the swivel tables can furthermore be used as a further machine axis so that, during machining of the workpieces, these can be provided to the tool in a different angular alignment about the X-axis.

In order to increase the flexibility of machining, the tool spindle can be swivelled about an axis which runs transversely to the swivel axis so that oblique machining of the workpieces is also possible from this direction.

In general, the three orthogonal axes are realized in the tool spindle which is arranged in a spindle head which is arranged, where necessary in a swivelling manner, on a stand and is adjustably on the stand in the direction of the longitudinal axis of the tool, i.e. the Z-axis. This stand enables movement in the two other spatial directions, i.e. in the X and Y direction.

It is also known in the case of machining of very long structural parts to move the workpiece changer in the direction of the swivel axes and the axis of rotation of the wheels, i.e. in the X direction with respect to the tool spindle, i.e. to realize at least one axis in the workpiece.

When the workpiece clamped on the swivel table located in the working position has been machined, the wheels are rotated about the axis of rotation by 180° so that the other swivel table is now located in its working position and the workpiece which has just been machined can be replaced by a workpiece still to be machined.

For the purpose of this change of workpiece, the two wheels are rotated synchronously with one another about 180° so that they are rotated from their first angular position, in which one swivel table is in its working position, into their other angular position, in which the other swivel table is located in working position.

It is also known to equip such a workpiece changer not with two, but rather, for example, with four swivel tables so that the swivel tables are arranged on the wheels offset with respect to one another by 90°. The workpiece changer correspondingly then has four designated angular positions for its wheels in which in each case one of the swivel tables is located in its working position.

Although the known workpiece changers have proved useful in many applications, the machine tools fitted with them are very large, particularly in cases where large structural components which also have a corresponding length in the x direction of, for example, 3 m are supposed to be machined on them.

In particular when machining of the workpieces is supposed to be carried with a double spindle into which therefore two machining tools are inserted which machine the workpiece located in the working position independently of one another, the overall dimensions of the known workpiece change table are so large that a machine tool in the cabin or housing of which the workpiece changer is set up has a very large volume.

SUMMARY OF THE INVENTION

In view of the above, one object underlying the present invention is to improve the known workpiece changer such that it has overall smaller dimensions and enables a quick change of workpiece while having a large clamping surface on the workpiece tables and a structural simple design.

According to the invention, this object and other objects are achieved in the case of the known workpiece changer in that the two wheels are supported at their rim.

The inventors of the present invention have namely recognized that a major problem of known workpiece changers lies in the fact that, in one structural variant, the swivel axis lies in a shaft running centrally through the wheels, for which purpose corresponding rotary bearings are also provided there for the shaft.

The shaft forming the swivel axis runs between the swivel tables from one wheel to the other in order to ensure that the two wheels are rotated synchronously which is essential for the precision of the positioning of the swivel tables. The synchronous rotation of the wheels furthermore ensures that the swivel tables themselves, which are mounted rotatably on the two wheels, do not tilt or twist.

This central shaft on which the two wheels are mounted is supported in corresponding receptacles or brackets, wherein the motor for rotation of the wheels is provided on one of these receptacles from the outside.

This construction leads to the entire workpiece changer being overall very wide in the x direction because, in addition to the width of the swivel tables, the width of the wheels and the motor and the two bearings for the wheels must also be taken into account.

Moreover, the shaft running centrally through the two wheels leads to the two swivel tables having to have a specific distance to one another so that the interference contour of the clamped workpieces does not collide with the central shaft during rotation of the swivel tables about their respective swivel axis.

In the case of other construction variants, both wheels are driven so that, where applicable, the central shaft can be omitted, but drives with a wide structure in the x direction are correspondingly provided for this purpose at both wheels.

The total width of the workpiece changer could thus be reduced in that the or each drive motor is not arranged centrally, rather is positioned outside of the contour of the wheel in front of the workpiece changer. However, this leads to the depth of the thus modified workpiece changer increasing again.

The inventors of the present application have now taken a completely different path by virtue of the fact they mount the two wheels on their rim.

As a result, on one hand, the central shaft is omitted so that, in the case of identical interference contours of the workpieces clamped on the swivel tables, the two swivel tables themselves can have a smaller distance to one another because namely the central shaft is absent. This enables wheels with a smaller diameter than in the prior art.

The new workpiece changer furthermore does not require a central bearing on which the wheels are held. This again also reduces the width of the workpiece changer in the x direction.

Moreover, the support—according to the invention—of the wheels at their rim furthermore makes it possible to allow the rotary drive to engage directly on the rim what offers a large number of structural possibilities for positioning the rotary drive on the new workpiece changer.

In one embodiment, each wheel has an annular guide rail which extends centrally with respect to the axis of rotation and which runs in guide shoes which are fastened to a structural element of the machine tool, wherein the guide shoes are fastened to the structural element, preferably with an overlap angle in relation to the guide rail of less than 180°.

This measure is particularly structurally advantageous since only a small region of the entire circumference of the respective wheel is required for the mounting so that the remaining region of the circumference of the wheel is free of structural parts of the workpiece changer and does not require any more space there than corresponds to the diameter of the wheel.

The guide shoes represent as it were the bearing for the respective wheel, wherein the guide rail is formed like a short cylinder wall that runs externally on the circumference of the wheel and extends in the direction of the axis of rotation.

If the annular guide rails of the two wheels point to one another, this furthermore means that the guide shoes and the guide rails are arranged in the space between the two wheels what once again contributes to a reduction in the width of the new workpiece changer.

According to a further embodiment, each wheel is rotatable about the axis of rotation via a rotary drive which engages on its annular circumferential surface, wherein each wheel may be provided with a traction means element which extends at least partially along its circumferential surface, which traction means element interacts with a drive pinion of the rotary drive, wherein the traction means element may further be fixed with both its ends on the circumferential surface of the wheel and may loop around the drive pinion.

A traction means element refers in the present case to an element that is formed as a toothed belt, chain, cord, V-belt or comparable drive element.

In the case of this measure, it is advantageous that the rotary drive also engages directly externally on the rim of the wheels, wherein a lower torque is required at the drive in order to rotate a wheel externally on its rim than if the rotary drive were to sit directly on the central shaft.

A traction means drive is furthermore structurally advantageous because it has a narrow design and is easy to mount and maintain.

Alternatively, it would also be possible to provide a spur gearing directly on the circumferential surface of the wheels, and drive the wheel directly via a pinion.

A traction means drive, in the case of which one end of the traction means element is arranged on the circumferential surface of the wheel, and the traction means element then extends along the circumference, i.e. the circumferential surface of the wheel, then runs to a drive pinion, loops around this and goes back to the wheel, wherein the second end of the traction means element is also fastened on the circumferential surface, represents a structurally simple and smooth-running drive. It may be necessary to guide the traction means element through under a tensioning roller in order to place it on the wheel over as large as possible a region of the circumference of the wheel, i.e. the annular circumferential surface.

In the case of this construction, in contrast to the drive via the face-side toothing, it is indeed no longer possible to rotate the wheels permanently in one direction, but it is entirely sufficient for the change of workpiece if the two wheels can be rotated to and fro by 180° with respect to a home position.

In one embodiment, the rotary drive has a rotary motor which drives a drive shaft on which two drive pinions sit via which the two wheels can be driven about the axis of rotation.

This measure is also structurally advantageous since in this manner both wheels are rotated synchronously even if, in contrast to the prior art, no central drive shaft but rather a drive shaft is provided that can now be arranged outside the contour of the wheels in front of or below the workpiece changer.

This type of drive therefore does not increase the depth of the new workpiece changer across the diameter of the wheels.

In a further embodiment, an indexing device is assigned at least to one of the two wheels, which indexing device fixes the wheel in the angular positions.

It is advantageous in the case of this measure that at least one of the two wheels is stationary in the angular positions in which in each case one swivel table is located in its working position so that during machining of the workpieces the swivel tables are held in their position by the indexing device and cannot rotate.

Particularly if the rotation of the wheels is carried out via a traction means drive, the indexing device ensures in a structurally simple manner that the wheels cannot be rotated out of the working position.

A corresponding indexing device may be provided each of the two wheels.

In one embodiment, the indexing device comprises two onboard positive-locking elements which are arranged on the wheel, and which are each assigned to a working position of a swivel table, and to which is assigned a stationary positive-locking element with which the onboard positive-locking element can be locked, the assigned swivel table whereof being located in its working position.

This measure ensures a structurally simple design of the indexing device, wherein the indexing device is also easy to adjust. Namely either only the onboard or the stationary positive-locking elements have to be adjustable.

If the workpiece changer contains two swivel tables, corresponding positive-locking elements are arranged on the wheel or wheels at two diametrically opposite positions. These onboard positive-locking elements swap their position in the case of each workpiece change, are therefore also rotated back and forth by 180°.

A stationary positive-locking element is additionally provided which can be arranged, for example, on a structural element of the machine tool. This stationary positive-locking element is arranged such that it can then always be locked with one of the onboard positive-locking elements when the swivel table assigned to the respective onboard positive-locking element is located in its working position.

The arrangement of the onboard positive-locking elements and the resultant arrangement of one stationary positive-locking element per wheel can be selected such that the indexing device is accommodated in a manner which is geometrically suitable for the workpiece changer, without noticeably impairing its width, depth or height.

The stationary positive-locking element can be arranged, for example, so that it is displaceable in the direction of the axis of rotation of the wheels and can thus be pushed onto the onboard positive-locking elements and locked with these when a working position of a swivel table is reached.

According to another embodiment, the indexing device further comprises a longitudinally displaceably mounted positive-locking element which can be brought into engagement with the onboard positive-locking element, the assigned swivel table of which is located in its working position, and the stationary positive-locking element.

In the case of this measure, it is advantageous that the stationary positive-locking element, which therefore defines the reference position for the working position, has not to be movable even not in the direction of the axis of rotation, i.e. is in actual fact a stationary positive-locking element.

The stationary or fixed positive-locking element can in this manner be adjusted with high precision in relation to the working position. In the working position of a swivel table, the assigned onboard positive-locking element is then located next to the stationary or fixed positive-locking element so that the displaceably mounted positive-locking element can then be pushed onto both positive-locking elements, and thus lock these to one another.

If the onboard positive-locking element each is arranged externally at the rim of a wheel, a very solid locking of the wheel in the respective working positions of the swivel tables can be produced in this manner.

The positive-locking elements may be formed as gear rack segments.

It is advantageous here that as a result of the pitch of the teeth of the gear rack segments a very high resolution in the relative position of the gear rack segments to one another and thus a very precise positioning of the wheels is possible.

In one embodiment, at least at one of the two wheels an energy chain is provided that winds on and off during rotation of the wheels about the axis of rotation, via which energy chain the workpiece changer is supplied with energy and/or media.

This measure also ensures that the size of the new workpiece changer is reduced since it is also not necessary for the supply of electrical energy, hydraulic oil or pneumatic air and for the transfer of measurement and control signals to arrange components in the axis of rotation of the wheels, rather the energy chain can be arranged in the external region of the wheel, but within its circumference, and can correspondingly wind on and off during swivelling to and fro of the wheels.

This measure is particularly advantageous if a swivelling drive is assigned to each swivel table, which swivelling drive is mounted on one of the two wheels.

Because the swivel tables themselves can be formed very rigidly like a cradle device, it is namely only necessary to drive the swivel tables at one end of the swivel axis, i.e. at one wheel. The swivelling drives required for this purpose have a very much smaller structure than a centrally arranged swivelling drive for the entire workpiece changer so that the swivelling drives hardly or do not noticeably impair the entire width of the new workpiece changer. It is also possible to integrate the swivelling drives partially in the wheels themselves.

The swivelling drives of the swivel tables are thus supplied with energy and actuated via the energy chain.

In the event that automatically actuated devices, rinsing devices, sensors, etc. are provided on the swivel tables, the swivel tables themselves must also be supplied with energy and media.

In view of the above, on that one wheel an energy chain which winds on or off during swivelling of the swivel tables about their respective swivel axis may be provided for each swivel table, via which energy chain devices on the respective swivel table are supplied with energy and/or media.

At least one separating wall may be provided between the wheels, which separating wall separates the swivel table located in the working position from the at least one other swivel table.

In the case of this measure, it is advantageous that, as a result of a structural element between the swivel tables, which can be formed to be very thin-walled, a reinforcement of the two wheels parallel to one another is possible which increases the precision with which the swivel tables can be positioned in working positions.

If a separating wall connected to the wheels is provided between the wheels, this ensures adequate rigidity of the swivelling device comprising the wheels and the swivel tables such that the two wheels only have to be guided at their rim across a small angle range.

The inventors of the present application have recognized that it is sufficient if the wheels are guided at their rim across an angle range of approx. 120°, the other 240° of the rim are thus free and define, as it were, the external contour of the new workpiece changer there.

It is further advantageous here that the frame of the machine tool only has to have structural elements for mounting the wheels in this region.

If, in contrast, the wheels are already sufficiently reinforced by the swivel tables and the other guidance at their rim, it is not absolutely necessary that the separating wall is connected to the two wheels.

In this case, the separating wall can be arranged such that it only serves to cover the swivel table located in the working position so that chips and drilling and cooling water which arise during machining of the workpiece clamped there do not exit out of the working region of the machine tool and thus impair or even endanger operating personnel replacing a machined workpiece for a blank at the other swivel table.

In one embodiment, a window is provided in at least one of the two wheels for each swivel table, through which window the swivel table can be observed, the window preferably being mounted movably on the wheel.

In the case of this measure, it is on one hand advantageous that the machining process can be observed at all times from the outside, to which end corresponding windows or panes are also provided in the housing of the machine tool.

A particular advantage of the window mounted movably on the wheel lies in the fact that an intervention can be made at any time from the side into the working space of the machine tool so that corresponding windows or openings in the separating wall can be omitted. In this manner, the separating wall can be configured to be very thin which once again leads to a reduction in the size of the new workpiece changer.

Opening of the windows on the wheel can be brought about in that these windows are always coupled to a window in the housing of the wheel when a swivel table is located in its working position.

A stop may be provided on the window which is movably mounted on the wheel, which stop interacts with a locking part which only allows a displacement of the window when the wheels are located in one of their designated angular positions.

It is advantageous here that the windows cannot move to and fro during rotation of the wheels if, for example, the guides of the windows have clearance.

According to one embodiment, the locking part is arranged in a stationary manner on a housing wall and is formed as a ring against the circumferential surface of which the stop bears during rotation of the wheels, at least one groove for the stop being provided in the ring, which groove enables a displacement of the window when the wheels are located in one angular position.

In this manner, a very simple locking device is produced. It is only when a swivel table is located in its working position that the stop lies opposite the groove in the ring so that the window can be moved.

In view of the above, the present invention further relates to a machine tool with a tool spindle into which the tools can be clamped for machining of workpieces, the machine tool being fitted with the new workpiece changer.

Further advantages will become apparent from the description and the enclosed drawing.

It will be obvious that the above-mentioned features which are still to be explained below can be used not only in the respectively indicated combination, rather also in other combinations or on their own without departing from the scope of the present invention.

BRIEF DESCRIPTION OF THE DRAWINGS

Embodiments of the invention are represented in the enclosed drawing and are explained in greater detail in the following description. In the drawing:

FIG. 8 shows an enlarged representation of the locking element which is shown centrally in FIG. 6.

DESCRIPTION OF A PREFERRED EMBODIMENT

Figure 1:
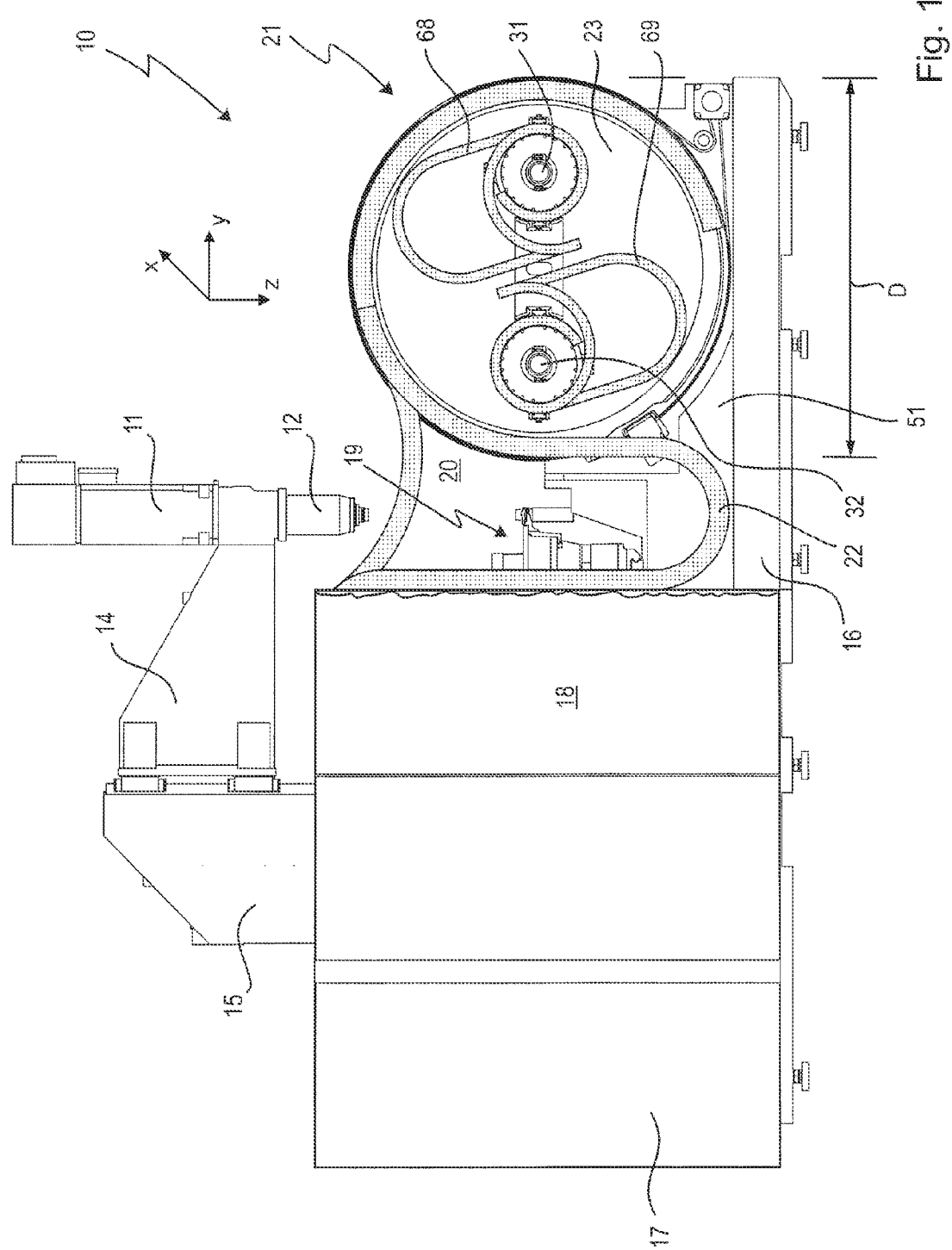
FIG. 1 shows a schematic side view of a machine tool which is fitted with the new workpiece changer.

FIG. 1 shows a schematic side view, which is not to scale, of a machine tool 10 on which a tool spindle 11 is provided into which a tool 12 is clamped.

Tool spindle 11 is mounted rotatably on a spindle head 14 which is mounted in a height-adjustable manner on a moving stand 15 in the direction of the axis of rotation of tool 12, i.e. in the Z direction. Moving stand 15 is in turn mounted displaceably on a frame 16 of machine tool 10 in the two other orthogonal spatial directions, i.e. in the X and Y direction.

Machine tool 10 furthermore has a housing 17 which surrounds all the structural components. In FIG. 1, housing 17 is only represented by a housing wall 18 which is also shown broken away so that a tool magazine 19 is apparent in which tools 12 can be held in available which can be exchanged into tool spindle 11, for example, using the pick-up method.

In this manner, a tool clamped into tool spindle 11 can be moved in all three spatial directions X, Y, Z in a working space indicated at 20, into which working space a workpiece changer 21 protrudes partially in FIG. 1 from the right, which workpiece changer 21 is formed to be drum-like.

In a manner still to be described, workpiece changer 21 is arranged rotatably about the X-axis, which is why it is supplied via an energy chain 22 with electrical energy, media and control signals.

In a manner known per se, energy chain 22 winds on and off during rotation of workpiece changer 21 about the X-axis.

Figure 2:
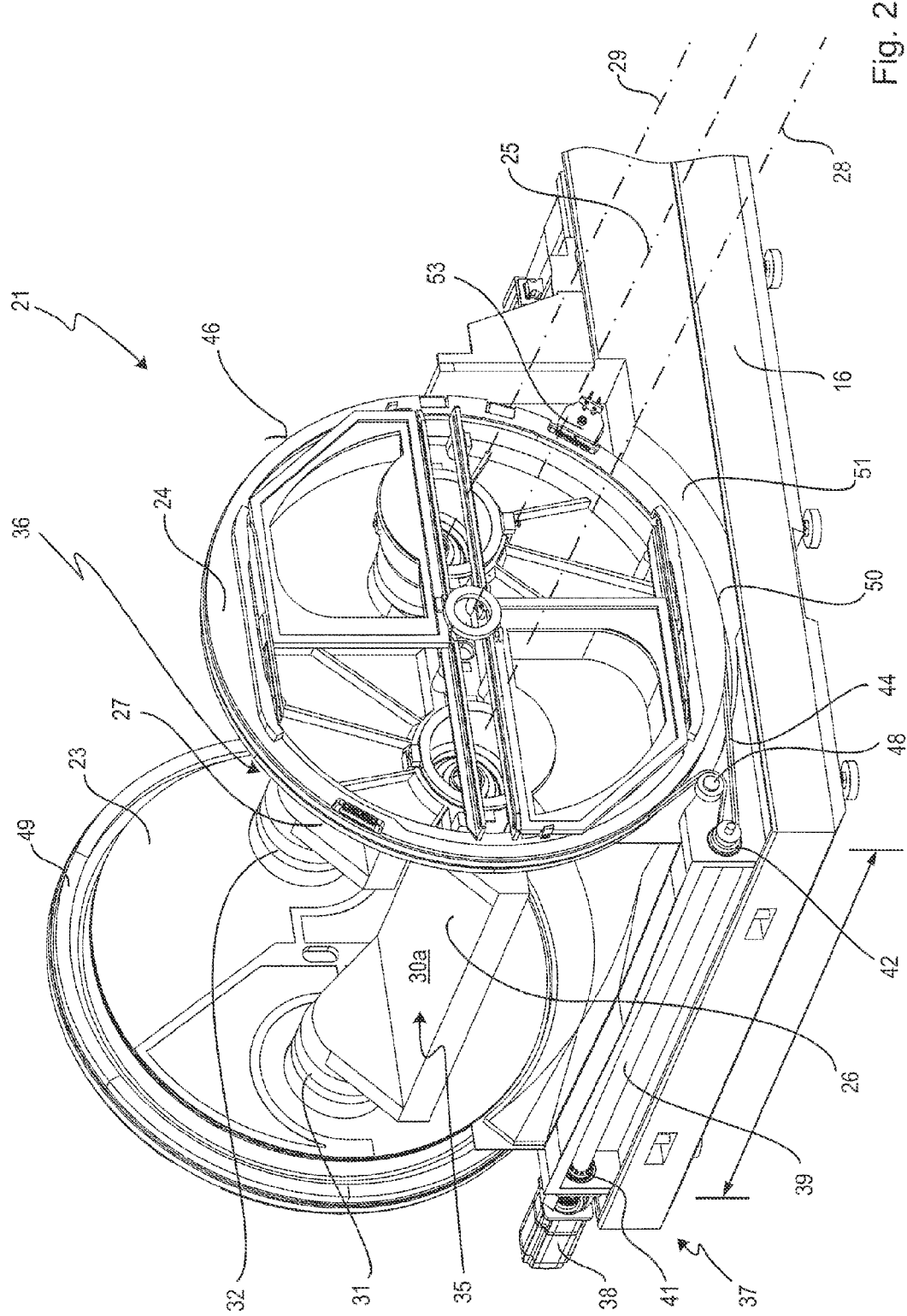
FIG. 2 shows a schematic perspective view of the workpiece changer from FIG. 1.

FIG. 2 shows workpiece changer 21 from FIG. 1 in a schematic, perspective representation. Workpiece changer 21 comprises two wheels 23 and 24 which are rotatable about an axis of rotation 25 which corresponds to the X-axis from FIG. 1.

The representation in FIG 2 is such that the front wheel 23 in FIG. 1 is shown behind wheel 24 in FIG. 2.

Two swivel tables 26 and 27 are provided between the two wheels 23 and 24, which swivel tables 26 and 27 can each swivel about a swivel axis 28 or 29 running parallel to the axis of rotation 25.

Swivel tables 26 and 27 are formed like cradle devices, they therefore each comprise a flat panel 30a with two cheeks 30, of which in FIG. 2 the rear cheek is fastened to a swivelling drive 31 or 32, via which swivel tables 26 and 27 can be swivelled to and fro at least about 180°.

Figure 3:
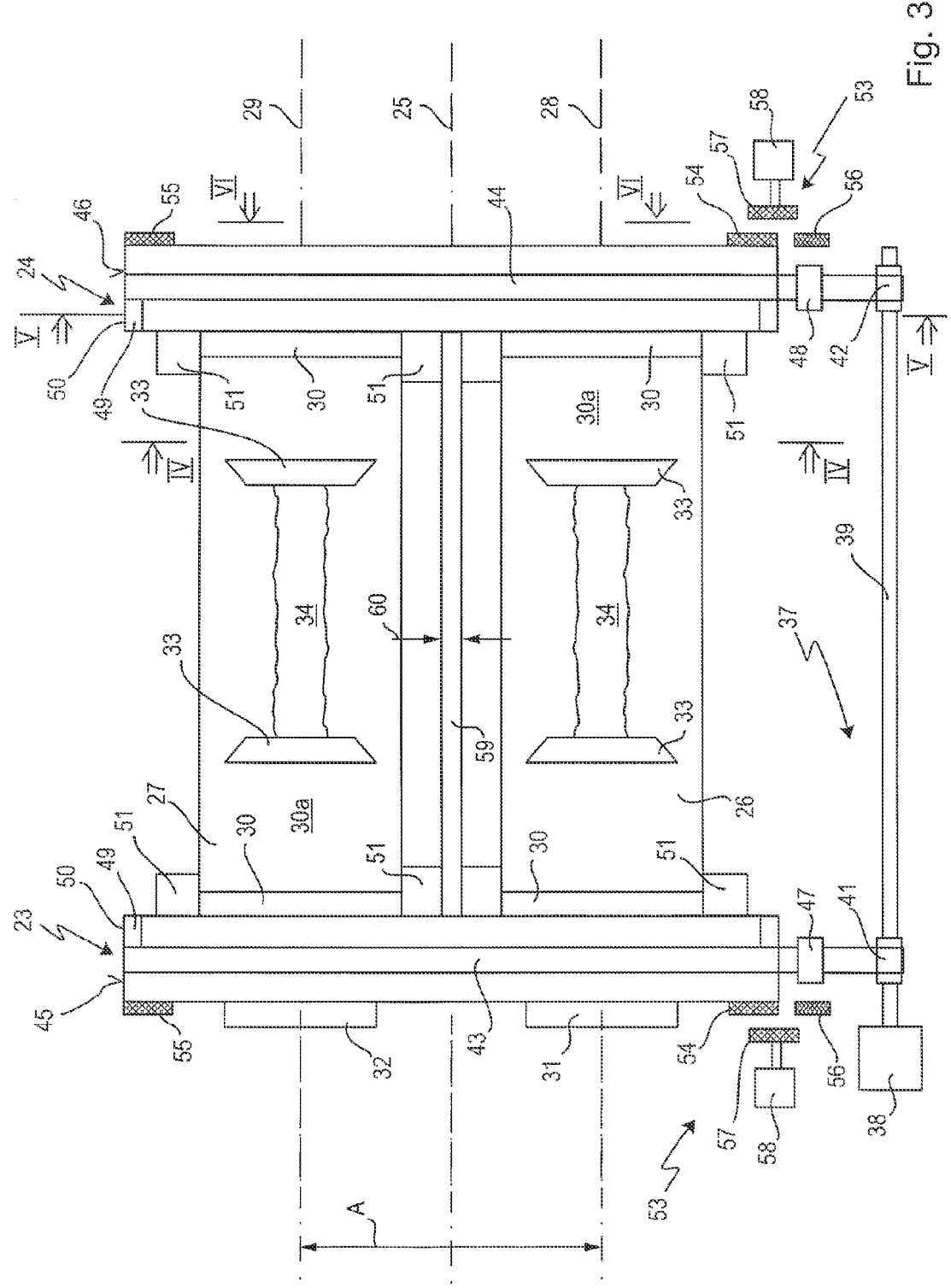
FIG. 3 shows a top view of the workpiece changer from FIG. 2, in a schematic representation which is not to scale.

FIG. 3 shows a top view of workpiece changer 21 from FIGS. 1 and 2, wheel 23 being arranged on the left in FIG. 3 in an analogous manner to FIG. 2. It is apparent in the top view of FIG. 3 that there are arranged on panels 30a of swivel tables 27, 28 devices 33 which serve to clamp in workpieces 34 which are supposed to be machined with tools 12.

It is apparent from the comparison of FIGS. 1, 2 and 3 that lower swivel table 27 in FIG. 3 is located outside working space 20, it is in its exchange position in which a machined workpiece 34 can be exchanged for a blank.

In contrast to this, swivel table 27 is located in its working position 36, has therefore been swivelled into working space 20 so that now workpiece 34 clamped on it can be machined there.

In order to be able to swivel said swivel tables 26 and 27 between exchange position 35 and working position 36, wheels 23 and 24 are connected to a rotary drive 37 arranged next to and below wheels 23, 24, which rotary drive 37 has a rotary motor 38 which drives a drive shaft 39 which extends parallel to axis of rotation 25.

Two drive pinions 41 and 42 sit on drive shaft 39, around which drive pinions 41 and 42 there is looped in each case a toothed belt 43 or 44 which serves as a traction means element and runs in each case around an annular circumferential surface 45 or 46 of wheels 23 or 24.

For tensioning of toothed belts 43 or 44, in each case a tensioning roller 47 or 48 is arranged between wheels 23 or 24 and pinions 41 or 42.

Figure 5:
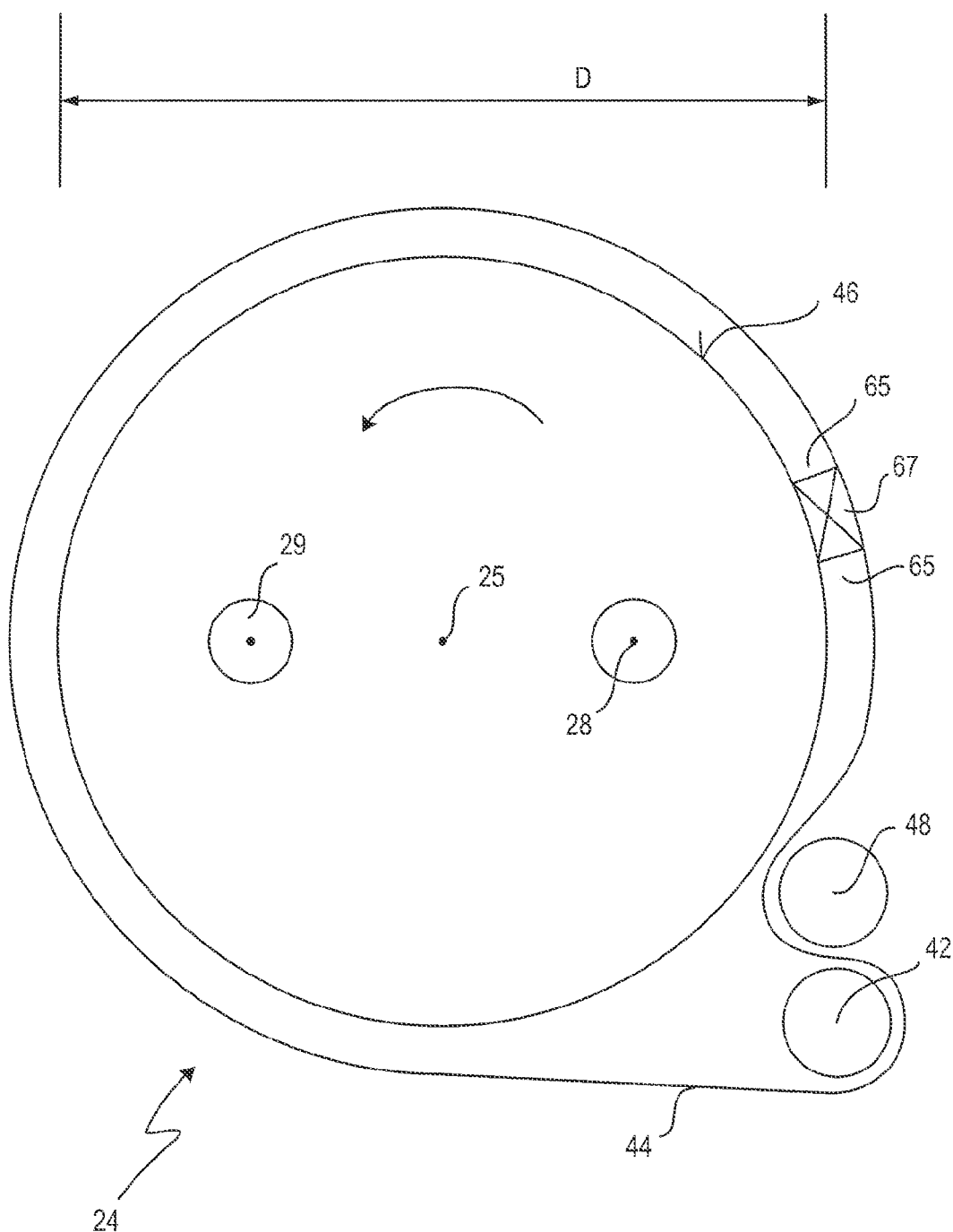
FIG. 5 shows a view of the workpiece changer from FIG. 3 along line V-V from FIG. 3.

The looped arrangement of toothed belt 44 on wheel 24 is particularly clearly apparent in FIG. 2. It is furthermore apparent from FIG. 2 that entire rotary drive 37 is arranged quasi below the outer contour of wheels 23, 24. In FIG. 3, for reasons of clarity, the rotary drive is represented outside the contour, but the spatially correct arrangement is shown in FIG. 5 which will be discussed below.

It is further apparent in FIG. 3 and in FIG. 2 than an annular guide rail 49 is provided at wheels 23 or 24 which is arranged centrally with respect to axis of rotation 25 and has the shape of a short cylinder.

Figure 4:
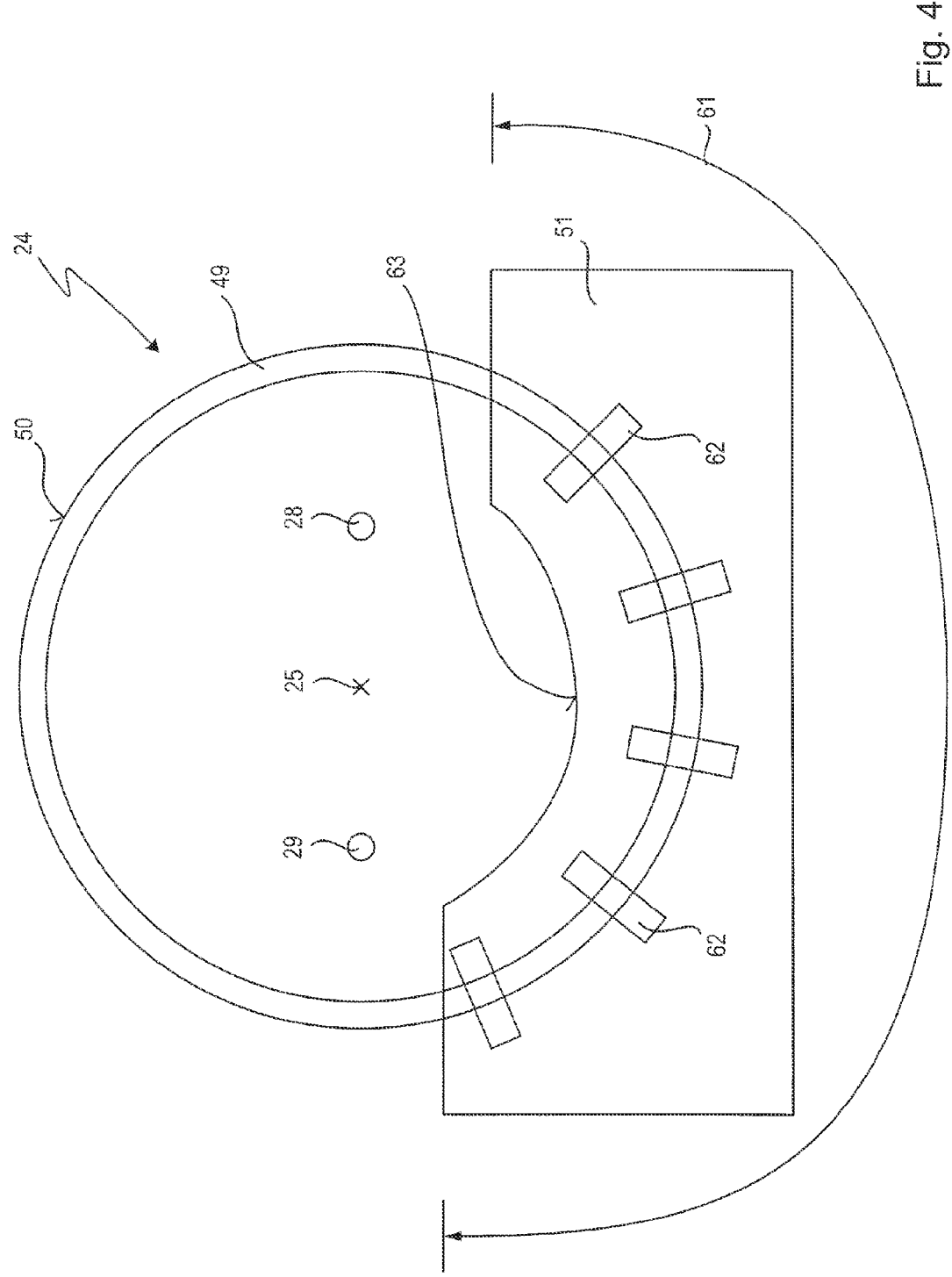
FIG. 4 shows a view of the workpiece changer from FIG. 3 along line IV-IV from FIG. 3.

Annular guide rails 49 are as it were arranged at an rim 50 of wheels 23 and 24 which are therefore mounted via their rim 50 on a structural element 51 of frame 16 of the machine tool as is more clearly apparent in FIGS. 1, 2 and 4.

It is furthermore apparent in FIG. 3 that an indexing device 53 is assigned to each wheel 23, 24, which indexing device 53 comprises at each wheel 23, 24 two onboard gear rack segments 54 and 55. Each gear rack segment 54 or 55 is assigned to a swivel table 26, 27, and indeed in a crisscross manner, as is also explained below.

Each indexing device 53 further comprises a fixed, i.e. stationary gear rack segment 56 which is arranged parallel to wheels 23, 24.

FIG. 3 shows the situation in which gear rack segments 54, which are assigned to working position 36 of swivel table 27, lie in alignment with stationary gear rack segments 56.

In order to now lock onboard gear rack segments 54 with stationary gear rack segments 56, there is provided in each indexing device 53 a longitudinally displaceable gear rack segment 57 which can be brought into engagement with both gear rack segments 54, 56 via an actuating drive 58.

As soon as this engagement has been carried out, wheels 23, 24 are indexed, i.e. they can no longer be displaced about their axis of rotation 25.

Gear rack segments 54, 55, 56, 57 represent an embodiment of positive-locking elements which can be used in indexing device 53.

If swivel tables 26, 27 are supposed to swap their positions, wheels 23, 24 must be moved into their respective other angular position. For this purpose, indexing devices 53 are initially disengaged by virtue of the fact that actuating drives 58 pull back longitudinally displaceable gear rack segments 57. Thereafter, drive shaft 39 is rotated via rotary motor 38 and via this then by means of toothed belts 43, 44 wheels 23, 24 are rotated by 180° so that swivel table 26 now reaches working position 36.

In order to fix the wheels in the new angular position in a precisely positioned and non-rotatable manner, longitudinally displaceable gear rack segments 57 now engage in onboard gear rack segments 55, which are assigned to the working position of swivel table 26, and in stationary gear rack segments 56.

Swivel tables 26, 27 must be swivelled about their swivel axes 28, 29 simultaneously with the rotation of wheels 23 and 24 so that workpieces 34 in FIG. 3 point upwards again.

It is furthermore apparent in FIG. 3 that a reinforcing separating wail 59 is provided between the two wheels 23, 24, which separating wall 59 has a very small thickness 60 so that swivel axes 28, 29 can have a distance A to one another which is merely caused by the interference contours of workpieces 34 and the dimensions of swivel tables 26, 27.

In this manner, the external dimensions of new workpiece changer 21 in the direction of the Y direction from FIG. 1 are limited to diameter D of wheels 23, 24, as is apparent in particular from FIG. 1.

Width B of the device is substantially determined by the distance of wheels 23, 24 to one another, indexing device 43 and rotary drive 37 only make an unnoticeable contribution to width B. as is apparent from FIG. 2.

FIG. 4 shows the machine tool from FIG. 3 in a view along IV-IV from FIG. 3. Wheel 24 is mounted with its annular guide rail 49 on a bent structural element 51 which covers wheel 24 with an overlap angle 61 which is significantly smaller than 180°. In the present case, the overlap angle is approx. 120 .

By way of example, five guide shoes 62 are shown on structural element 51, in which guide shoes 62 annular guide rail 49 is mounted which is covered by guide shoes 62 as a result in overlap angle 61.

Structural element 51 has a semi-circular recess 63 which points towards axis of rotation 25 of wheel 24. In this manner, the majority of the surface of wheel 24 is not covered by structural element 51.

Wheel 24 along line X-X from FIG. 3 is represented schematically in FIG. 5. It can be inferred from the representation of FIG. 5 that tensioning roller 48 and drive pinion 42 are arranged, as it were, below wheel 24, i.e. within its diameter D. It is furthermore apparent that toothed belt 44 is arranged with its first end 65 and its second end 66 via a fastening means 67 on circumferential surface 46 of wheel 24.

In this manner, it is possible to rotate wheel 24 out of the position shown in FIG. 5 by 180° in an anticlockwise direction about axis of rotation 25, and correspondingly naturally also rotate it back.

As already mentioned, swivel tables 26, 27 are also rotated to and fro in each case by 180° together with the rotation of wheels 23, 24 by ±180°, wherein the swivel tables can be swivelled even while they are located in their working position 36 in order to enable machining of workpieces 34 at an oblique angle.

The energy supply of swivelling drives 31, 32 is carried out via energy chain 22 which is apparent in FIG. 1, wherein FIG. 1 shows two further energy chains 68, 69 which do not serve to supply swivelling drives 31, 32, rather to supply devices 33 on swivel tables 26, 27.

Figure 6:
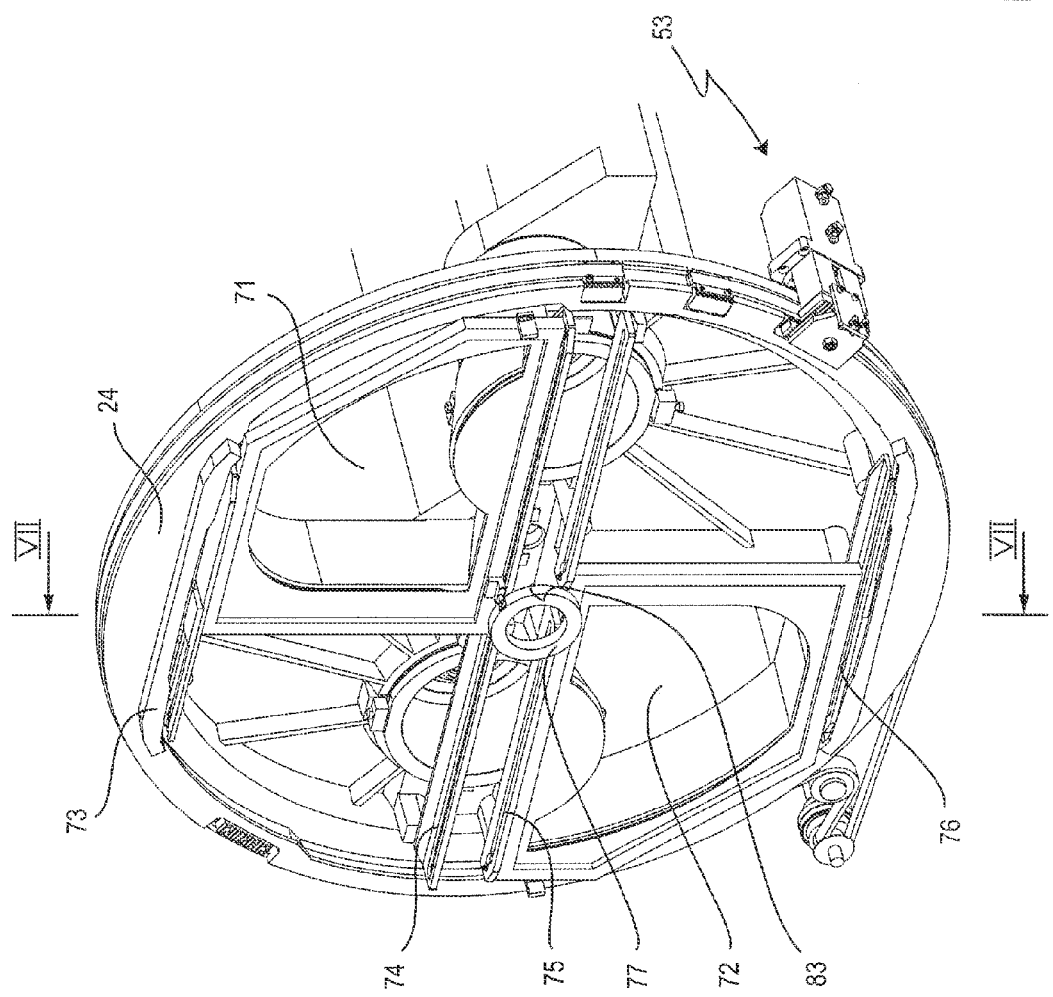
FIG. 6 shows a view of the workpiece changer from FIG. 3 along line VI-VI from FIG. 3.

FIG. 6 shows a top view of wheel 24 along line VI-VI from FIG. 3.

Wheel 24 is provided with two displaceable windows 71, 72 which are mounted movably between guides 73 and 74 or 75 and 76.

An annular locking part 77 is provided between guides 74 and 75, which locking part 77 interacts with two stops 78, 79 which are provided on windows 71 or 72.

Figure 7:
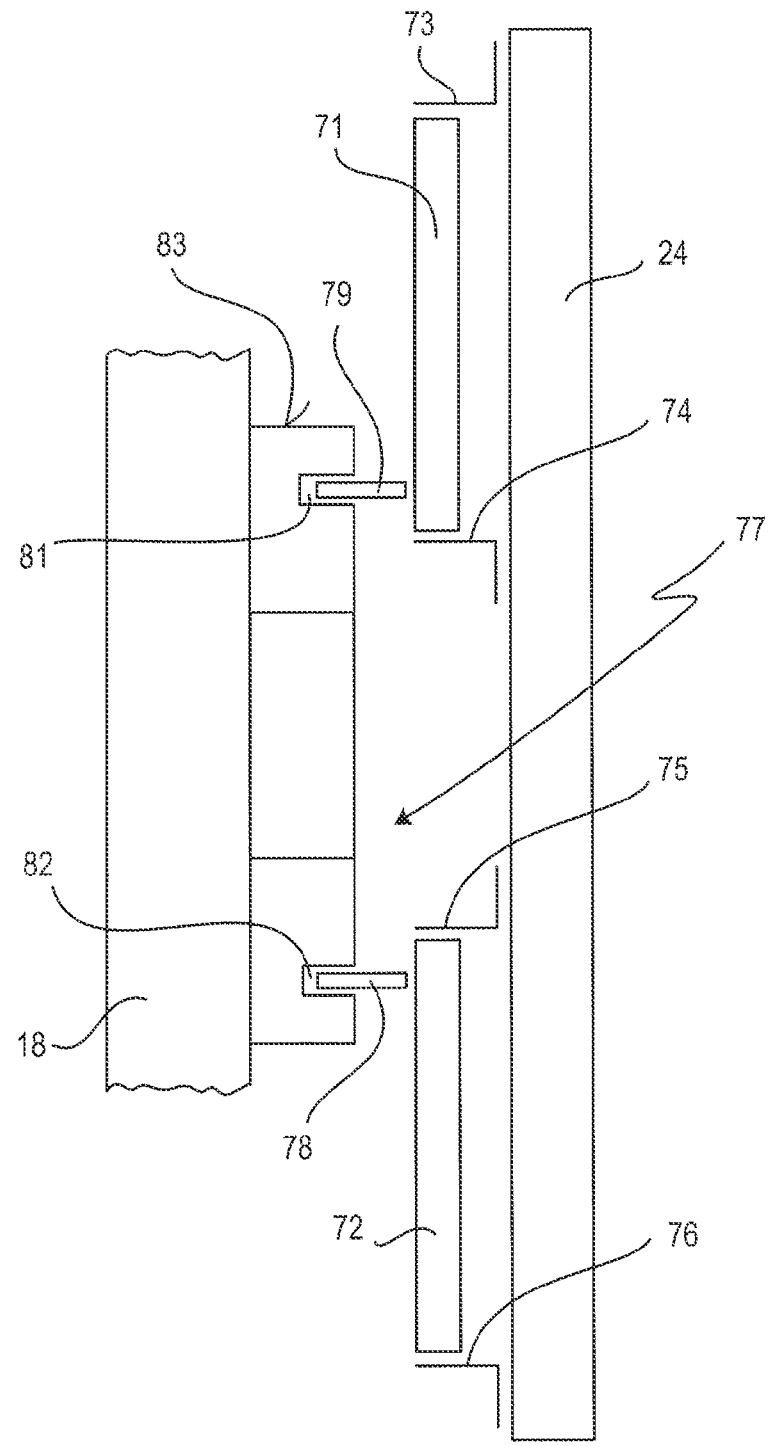
FIG. 7 shows a sectional representation of the wheel shown in FIG. 6 along line VII-VII from FIG. 6.

As is apparent from the sectional representation in FIG. 7 along line VII-VII from FIG. 6, locking part 77 is arranged on housing wall 18 which is only shown broken away in FIG. 1. Locking part 77 is formed here as a ring, but can also be formed as a disc.

In the position shown in FIGS. 6 and 7, stops 78, 79 lie at the height of grooves 81, 82 in locking part 77 so that windows 71, 72 can be displaced in guides 73, 74, 75, 76. However, as soon as wheel 24 has only rotated slightly about its axis of rotation 25, stops 78, 79 lie on a circumferential surface 83 of locking part 77 so that windows 71, 72 cannot be displaced and are not displaced by themselves as a result of their weight when wheels 23, 24 are rotated.

Therefore, what is claimed is:

1. A workpiece changer for use in a machine tool that comprises a tool spindle for clamping tools for machining workpieces, said workpiece changer comprising:
   two wheels which are arranged parallel to one another and which are rotatable about an axis of rotation into at least a first angular position and a second angular position, said two wheels having respective annular circumferential surfaces and being supported at their respective rims, and
   at least two swivel tables for clamping respective workpieces, the at least two swivel tables being arranged between said two wheels and each being mounted on said two wheels such as to swivel about a respective swivel axis that runs parallel to the axis of rotation,
   wherein in each of the first angular position and the second angular position one of the at least two swivel tables is located in a working position in which the respective workpieces clamped thereto are machined with the tools,
   a rotary drive comprising a rotating motor, a drive shaft operatively connected to said rotating motor, and two drive pinions that are arranged at said drive shaft, wherein each of the two drive pinions is operatively connected via a respective looped drive member to one of said two wheels for rotation thereof about said axis of rotation, and
   each looped drive member extending at least partially about the annular circumferential surface of the corresponding wheel.

2. The workpiece changer of claim 1, wherein each of said two wheels comprises a respective annular guide rail extending centrally with respect to the axis of rotation and running in corresponding guide shoes which are fastened to a structural element of the machine tool.

3. The workpiece changer of claim 2, wherein said guide shoes are fastened to the structural element such that they extend over an overlap angle in relation to the corresponding guide rail of less than 180°.

4. The workpiece changer of claim 1, wherein each looped drive member comprises two ends, each of said two ends of each looped drive member being fixed to said annular circumferential surface of the corresponding wheel, and each looped drive member running around and engaging the corresponding drive pinion.

5. The workpiece changer of claim 1, wherein an indexing device is provided and associated with at least one of said two wheels for fixing said wheels in the first and second angular positions.

6. The workpiece changer of claim 5, wherein said indexing device comprises two onboard positive-locking elements arranged on the at least one of said two wheels, each onboard positive-locking element being associated with the working position of a corresponding one of the at least two swivel tables, a stationary positive-locking element being provided and associated with said onboard positive-locking elements such as to lock the onboard positive-locking element associated with the corresponding one of the at least two swivel tables which is located in the working position.

7. The workpiece changer of claim 6, wherein the indexing device comprises a longitudinally displaceable positive-locking element for simultaneous engagement with the stationary positive-locking element and the onboard positive-locking element of the corresponding one of the at least two swivel tables which is located in the working position.

8. The workpiece changer of claim 1, wherein an energy chain is provided at least at one of the two wheels, said energy chain winding on and off during rotation of said two wheels about the axis of rotation, via which energy chain the workpiece changer is supplied at least with one of energy and media.

9. The workpiece changer of claim 1, wherein a swiveling drive is provided for and associated with each of said at least two swivel tables, each swiveling drive being mounted on a first of said two wheels.

10. The workpiece changer of claim 9, wherein on said first of said two wheels an energy chain is provided for each of said at least two swivel tables, each energy chain winding on or off during swiveling of the respective swivel table about its respective swivel axis, and each energy chain supplies devices provided on the respective swivel table with at least with one of energy and media.

11. The workpiece changer of claim 1, wherein at least one separating wall is provided between the two wheels, and the at least one separating wall separates a given one of the at least two swivel tables that is located in the working position from others of the at least two swivel tables.

12. The workpiece changer of claim 11, wherein the at least one separating wall is connected to both of said two wheels and reinforces the workpiece changer.

13. The workpiece changer of claim 1, wherein for each of the at least two swivel tables a respective window is provided in at least one of the two wheels, each window enabling visual inspection of the respective swivel table.

14. The workpiece changer of claim 13, wherein each window is mounted in the at least one of the two wheels such as to be displaceable.

15. The workpiece changer of claim 14, wherein on each window a stop is provided which interacts with a locking part which only allows a displacement of the corresponding window when the two wheels are located in one of the first and second angular positions.

16. The workpiece changer of claim 15, wherein the locking part is arranged stationary on a housing wall.

17. The workpiece changer of claim 16, wherein the locking part is formed as a ring device having a circumferential surface against which each stop bears during rotation of the two wheels, at least one groove being provided in the ring device, into which groove each stop enters when the two wheels are located in one of the first and second angular positions such as to enable displacement of each window.

18. A machine tool comprising a tool spindle for clamping tools for machining of workpieces, and a workpiece changer, said workpiece changer comprising:
- two wheels which are arranged parallel to one another and which are rotatable about an axis of rotation into at least a first angular position and a second angular position, said two wheels having respective annular circumferential surfaces and being supported at their respective rims, and
- at least two swivel tables for clamping respective workpieces, the at least two swivel tables being arranged between said two wheels and each being mounted on said two wheels such as to swivel about a respective swivel axis that runs parallel to the axis of rotation,
- wherein in each of the first angular position and the second angular position one of the at least two swivel tables is located in a working position in which the respective workpieces clamped thereto are machined with the tools,
- a rotary drive comprising a rotating motor, a drive shaft operatively connected to said rotating motor, and two drive pinions that are arranged at said drive shaft, wherein each of the two drive pinions is operatively connected via a respective looped drive member to one of said two wheels for rotation thereof about said axis of rotation, and each looped drive member extending at least partially about the annular circumferential surface of the corresponding wheel.

19. The workpiece changer of claim 18, wherein each of said two wheels comprises a respective annular guide rail extending centrally with respect to the axis of rotation and running in corresponding guide shoes which are fastened to a structural element of the machine tool.

20. The workpiece changer of claim 19, wherein said guide shoes are fastened to the structural element such that they extend over an overlap angle in relation to the corresponding guide rail of less than 180°.

21. The workpiece changer of claim 18, wherein an indexing device is provided and associated with at least one of said two wheels for fixing said wheels in the first and second angular positions.

22. The workpiece changer of claim 18, wherein at least one separating wall is provided between and connected to each of the two wheels so as to reinforce the workpiece changer, and the at least one separating wall separates a given one of the at least two swivel tables that is located in the working position from others of the at least two swivel tables.

* * * * *